J. W. MOYER.
Rock-Drilling Machine.
No. 165,681.
Patented July 20, 1875.
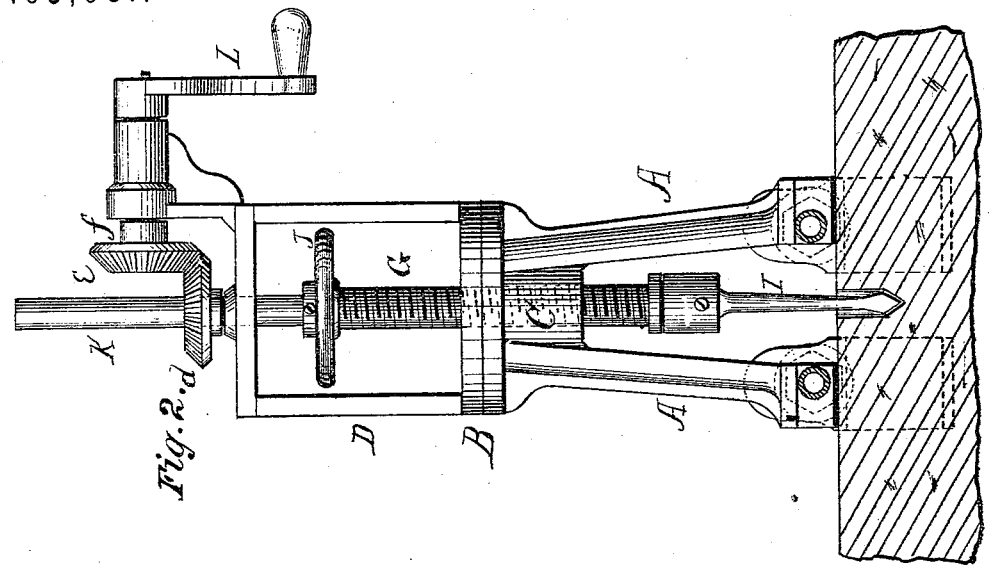
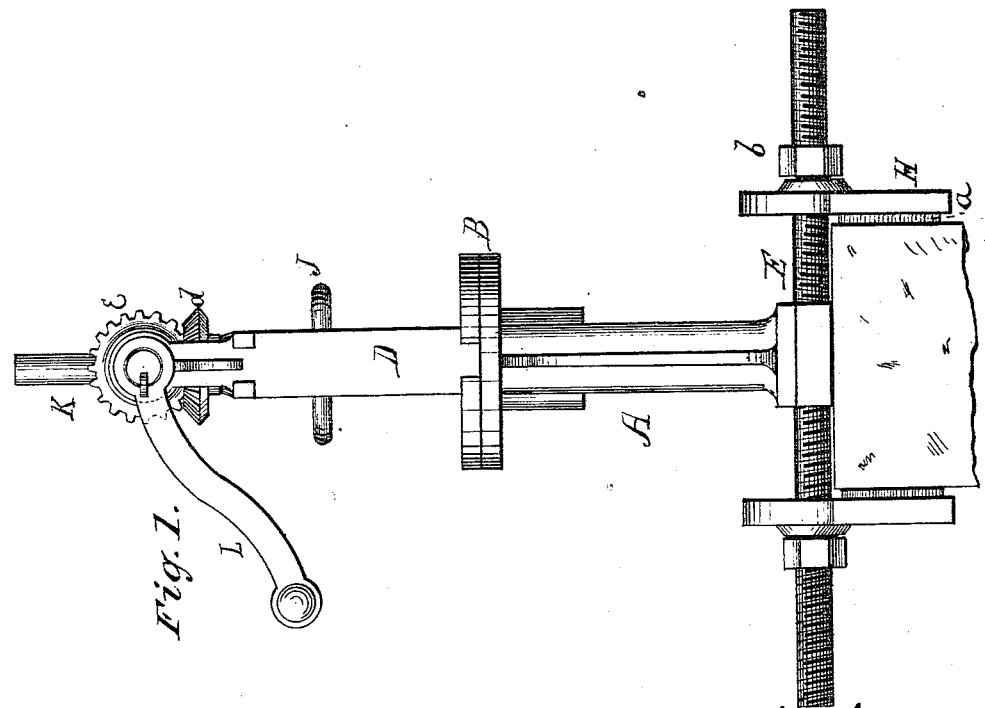
WITNESSES:
P. C. Dieterich
H. C. Scott
INVENTOR:
Jacob W. Moyer
per.
C. H. Watson & Co.
ATTORNEYS.

UNITED STATES PATENT OFFICE.

JACOB W. MOYER, OF DANVILLE, PENNSYLVANIA.

IMPROVEMENT IN ROCK-DRILLING MACHINES.

Specification forming part of Letters Patent No. 165,681, dated July 20, 1875; application filed July 3, 1875.

*To all whom it may concern:*

Be it known that I, JACOB W. MOYER, of Danville, in the county of Montour and State of Pennsylvania, have invented certain new and useful Improvements in Rock-Drills; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a machine for drilling rock, marble, &c., as will be hereinafter more fully set forth.

In the annexed drawing, Figure 1 is a side elevation of my drilling-machine, and Fig. 2 is a cross-section of the same.

A A represent two standards, connected at their upper ends by a circular disk, B, with a hub, C, projecting downward between the standards. From the disk B rises a frame, D, as shown, said frame, with the disk, hub, and standards, being all cast in one piece, or made in separate pieces, and firmly bolted or otherwise united together. The lower ends of the standards A are formed with suitable feet, in which are secured two parallel rods, E E—that is, one rod passes through the lower end of each standard. The rods E are formed with exterior screw-threads, running right and left from the standards outward, and on each end of each rod is placed a clamp, consisting simply of a plate, H, movable on the rod, and provided on its inner side with a lining, *a*, of rubber or other suitable material, and behind each plate H is a nut, *b*, to be screwed up on the rod. The plates H are moved up against the sides of the piece of marble, stone, &c., that is to be drilled, the standards resting thereon, with the drill directly over the point where the hole is to be made, and then the nuts *b b* are screwed up to tighten the plates against the work, thereby holding the machine firmly in its place. By this means the machine can easily be adjusted to any point desired. Through the center of the disk B and hub C is made a vertical hole with interior or female screw-threads, through which is passed the screw G, having the drill I coupled to its lower end. The upper end of the screw G is provided with a hand-wheel, J, and coupled to a rod, K, which passes up through the top cross-bar of the frame D. Above this frame on the rod is feathered a miter cogged pinion, *d*, which gears with a similar pinion, *e*, on a shaft, *f*, held in a box formed by the extension of one of the sides of the frame D. On the outer end of the shaft *f* is fastened a crank, L, by the turning of which the rod K, screw G, and drill I are revolved. The drill is fed by means of the hand-wheel J.

I am aware that clamps have been used in connection with a boring-machine, and I do not claim such as my invention, as my improvement admits of the machine being clamped to the stone to be drilled, and the drill adjusted to any desirable point by means of the independent adjustable clamps.

Having thus fully described my invention, what I claim as new, and desire to secure by Letters Patent, is—

1. In a rock-drill, the vertical standards A, secured to the adjusting screw-rods E, in combination with independent separate adjusting-clamps H, threaded corresponding with screw-rods E, substantially as and for the purposes herein set forth.

2. In a rock-drill, the frame A B C D, in combination with the screw G, drill I, wheel J, rod K, adjusting-rods E, and the independent separate adjusting plates or clamps H, and operating mechanism, substantially as and for the purpose set forth.

In testimony that I claim the foregoing as my own I affix my signature in presence of two witnesses.

JACOB W. MOYER.

Witnesses:
C. H. WATSON,
H. A. HALL.